Jan. 3, 1933.  M. BARBERIS ET AL  1,893,266
ELECTRIC CABLE
Filed March 2, 1931
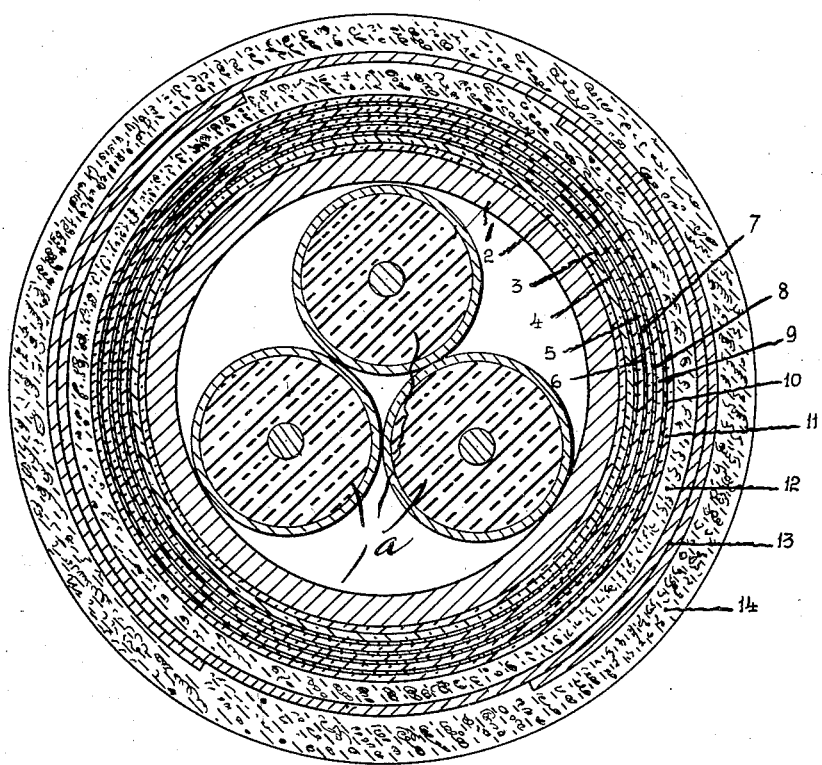
Inventors
Mario Barberis and
Ugo Baggi
by Henry Orth Jr.
Attorney Patented Jan. 3, 1933

1,893,266

UNITED STATES PATENT OFFICE

MARIO BARBERIS AND UGO BAGGI, OF TURIN, ITALY, ASSIGNORS, BY MESNE ASSIGNMENTS, TO S. I. R. T. I. (SOCIETÀ ITALIANA RETI TELEFONICHE INTERURBANE), OF MILAN, ITALY, A JOINT-STOCK COMPANY OF ITALY

ELECTRIC CABLE

Application filed March 2, 1931, Serial No. 519,570, and in Italy November 21, 1930.

It is known that underground cables are subject to frequent disturbances owing to the insufficient protection afforded by the armorings of the usual type.

The corrosion of the lead covering or sheath which is the cause of the above mentioned disturbances is due chiefly:

(1) To the effect of electrolysis generated by the stray or transient currents, such as e. g. the dispersion currents of return cables of electric tramways and railways;

(2) To the chemical action of the substances dissolved in the ground.

The result is that when the cable is laid in proximity to conductors traversed by electric current or in a ground containing acid substances, the lead covering or sheath is attacked after a more or less short time and as the corrosion extends in depth and width moisture is allowed to enter the cable which is inevitably grounded.

This invention relates to a protective coating for electric underground cables which preserves them against the injurious action of transient currents and of the acid substances contained in the ground.

According to this invention two or a plurality of layers of bitumen or of a neutral bituminous material are applied on the lead covering.

The single figure is a vertical transverse cross section through the cable, showing an ordinary electric cable therein.

Referring to the drawing, the numeral 1 designates the lead covering of a conventional form of cable 1a. A bitumen covering 2 is applied around the outer periphery of the lead covering in the following manner. First by laying a very thin layer of bitumen at 80° to 110° C. and thereon a second layer of bitumen at 70° to 80° C., then a rubber band or layer 3 is applied to the bitumen layer, and on this latter the varnished tapes made of paper and numbered 4, 6, 8 and 10, alternating with bitumen layers 5, 7, 9 and 11. A layer of bituminated jute is applied on the bitumen layer 11 and covered with an armoring 13 formed by two iron bands. Finally an outer layer of bituminated jute 14 is laid on the armoring.

The first layer which is very thin is applied at a temperature between 80° and 110° C. and it firmly adheres to the tube; its high temperature improves the adhesion of the second layer which is successively applied at 70° to 80° C. The second layer which is of harder bitumen is thicker than the former and once it has set it forms on the cable a continuous tube.

A ribbon of rubber of suitable composition is wound spirally with largely overlapping edges on the second bitumen layer and is protected against moisture by one or a plurality of paper tape layers made water-tight by impregnating them with suitable insulating varnishes such as wax and paraffine. The paper tapes are preferably wound in the same direction as the rubber band as this improves the adhesion. Layers of a suitable bituminous mixture are alternated with the paper tapes and are applied at a temperature such as will partly melt the varnish impregnating the paper tapes thus improving the cohesion of the coating which acquires the appearance and properties of a continuous tube structure. The usual armoring is laid on this coating and protects the cable chiefly against mechanical stresses.

The band protecting the cable against transient currents is conveniently made according to this invention of non-vulcanized rubber containing sulphur.

What we claim is:

1. In an electric cable in combination with a lead sheath protecting the cable, a layer of neutral bituminous material surrounding the lead sheath, an insulating rubber band wound about said layer, a water-tight paper tape wound on the insulating band and a bitumen layer on the paper tape.

2. In an electric cable, in combination with a lead sheath protecting the cable, a thin layer of neutral bituminous material applied on the lead sheath at a relatively high temperature, a second thicker layer of harder bituminous material applied on the former layer at a less high temperature, an insulating rubber band wound about said layer, a water-tight paper tape wound on the insulating band and a bitumen layer on the paper tape.

3. In an electric cable, in combination with a lead sheath protecting the cable, a thin layer of neutral bituminous material applied on the lead sheath at a relatively high temperature, a second thicker layer of harder bituminous material applied on the former layer at a lower temperature, a band of non vulcanized rubber containing sulphur wound on the second layer of bituminous material, a tape of water-tight paper impregnated with wax and paraffine varnish wound in the same direction as the rubber band and a layer of bitumen on the paper tape.

4. In an electric cable, in combination with a lead sheath protecting the cable, a thin layer of neutral bituminous material applied on the sheath at a temperature of about 95° C., a second thicker layer of harder bituminous material applied on the first layer at a temperature of about 75° C., an insulating rubber band wound about said layer, a water-tight paper tape wound on the insulating band and a bitumen layer on the paper tape.

5. In an electric cable, in combination with a lead sheath protecting the cable, a thin layer of neutral bituminous material applied on the sheath at a temperature of about 95° C., a second thicker layer of harder bituminous material applied on the first layer at a temperature of about 75° C., a band of non vulcanized rubber containing sulphur wound on the second layer of bituminous material, a tape of water-tight paper impregnated with wax and paraffine varnish wound in the same direction as the rubber band and a layer of bitumen on the paper tape.

In testimony that we claim the foregoing as our invention, we have signed our names.

MARIO BARBERIS.
UGO BAGGI.